United States Patent [19]
Hong

[11] Patent Number: 5,709,480
[45] Date of Patent: Jan. 20, 1998

[54] HEMISPHERICAL FLUID BEARING

[75] Inventor: Min-pyo Hong, Seoul, Rep. of Korea

[73] Assignee: Samsung Electronics Co., Ltd., Kyungki-Do, Rep. of Korea

[21] Appl. No.: 763,343

[22] Filed: Dec. 11, 1996

Related U.S. Application Data

[63] Continuation-in-part of Ser. No. 581,229, Dec. 29, 1995, abandoned.

[51] Int. Cl.$^6$ .................................................. F16C 32/06
[52] U.S. Cl. ........................ 384/100; 384/108; 384/907.1
[58] Field of Search ........................ 384/100, 107, 384/108, 112, 907.1, 109, 276, 280, 291, 292, 297, 912

[56] References Cited

U.S. PATENT DOCUMENTS

| | | | |
|---|---|---|---|
| 5,127,744 | 7/1992 | White et al. | 384/107 X |
| 5,315,196 | 5/1994 | Yoshida et al. | 384/107 X |
| 5,366,298 | 11/1994 | Toshimitsu et al. | 384/100 X |

FOREIGN PATENT DOCUMENTS

| | | | |
|---|---|---|---|
| 94020 | 7/1980 | Japan | 384/100 |
| 15121 | 1/1982 | Japan | 384/100 |
| 33809 | 2/1993 | Japan | 384/100 |

*Primary Examiner*—Thomas R. Hannon
*Attorney, Agent, or Firm*—Sughrue, Mion, Zinn, Macpeak & Seas, PLLC

[57] ABSTRACT

A hemispherical fluid bearing has a pair of inner rings, each having a spherical outer lubricating surface, which are fixed to a shaft, and an outer ring having a lubricating surface corresponding to the lubricating surfaces of the inner rings for supporting the rotation of the inner rings. One of the inner rings and the outer ring has a first film coating of titanium or ceramic formed on the lubricating surface thereof. Therefore, abrasion due to solid friction when a motor starts or stops is efficiently decreased.

7 Claims, 2 Drawing Sheets

HEMISPHERICAL FLUID BEARING

This is a Continuation-In-Part of application Ser. No. 08/581,229 filed Dec. 29, 1995, now abandoned.

BACKGROUND OF THE INVENTION

The present invention relates to a bearing, and more particularly, to a hemispherical fluid bearing.

In general, fluid bearings are used for supporting articles rotating at high speed. A conventional contact bearing such as a ball bearing or a roller bearing generates severe oscillation and noise, and rotates unstably, at high speeds. On the contrary, a fluid bearing, which rotates at high speeds in a non-contact manner, rotates stabily and seldom oscillates. Therefore, the fluid bearing is suited for applications in spindle motors of hard disk drives which must rotate rapidly, or a multi-surfaced mirror driving motor used in laser printers or laser scanners.

FIG. 1 is a sectional view of a conventional hemispherical fluid bearing. As shown, the conventional hemispherical fluid bearing is comprised of an upper inner ring 20 and a lower inner ring 30, each having a hemispherical outer surface, which are fixed to a shaft 10 of a motor, an outer ring 50 fixed in a bearing housing 40, a ring 60 for keeping upper inner ring 20 and lower inner ring 30 from being detached from shaft 10, a spacer 70 disposed between upper inner ring 20 and lower inner ring 30 for maintaining clearance between outer ring 50 and upper inner ring 20, and between outer ring 50 and lower inner ring 30.

Outer ring 50 supports upper inner ring 20 and lower inner ring 30 so that they can rotate. Since lubricant oil fills the clearance between outer ring 50 and inner rings 20 and 30 and generates fluid friction therebetween, upper inner ring 20 and lower inner ring 30 can rotate without making contact with outer ring 50. Therefore, a motor employing the hemispherical fluid bearing produces no oscillation and its rotation is stable.

However, the conventional hemispherical fluid bearing exhibits a distinct drawback in that the contact surfaces of outer ring 50 and inner rings 20 and 30 abrade when the motor starts and stops. That is, solid friction occurs between outer ring 50 and upper inner ring 20, and between outer ring 50 and lower inner ring 30, at or below a threshold speed, thus accelerating the abrasion. As a result, the life span of the hemispherical fluid bearing decreases.

SUMMARY OF THE INVENTION

The object of the present invention is to provide a hemispherical fluid bearing which can efficiently decrease abrasion caused by solid friction.

To achieve the above object, there is provided a hemispherical fluid bearing comprising a pair of inner rings, each having a spherical outer lubricating surface, and being fixed to a shaft in opposition to each other, and an outer ring having a lubricating surface corresponding to the lubricating surfaces of the inner rings for supporting the rotation of the inner rings, wherein at least one of the inner rings and the outer ring has a first film coating of titanium or ceramic formed on the lubricating surface thereof. The outer ring is preferably formed of ceramic. There is a second film coating of a diamond-like-carbon formed on the first film coating. A predetermined groove is formed in the second film coating which extends to the first film coating. The first film coating is 5–20 µm, and the second film coating is 0.1–5 µm.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
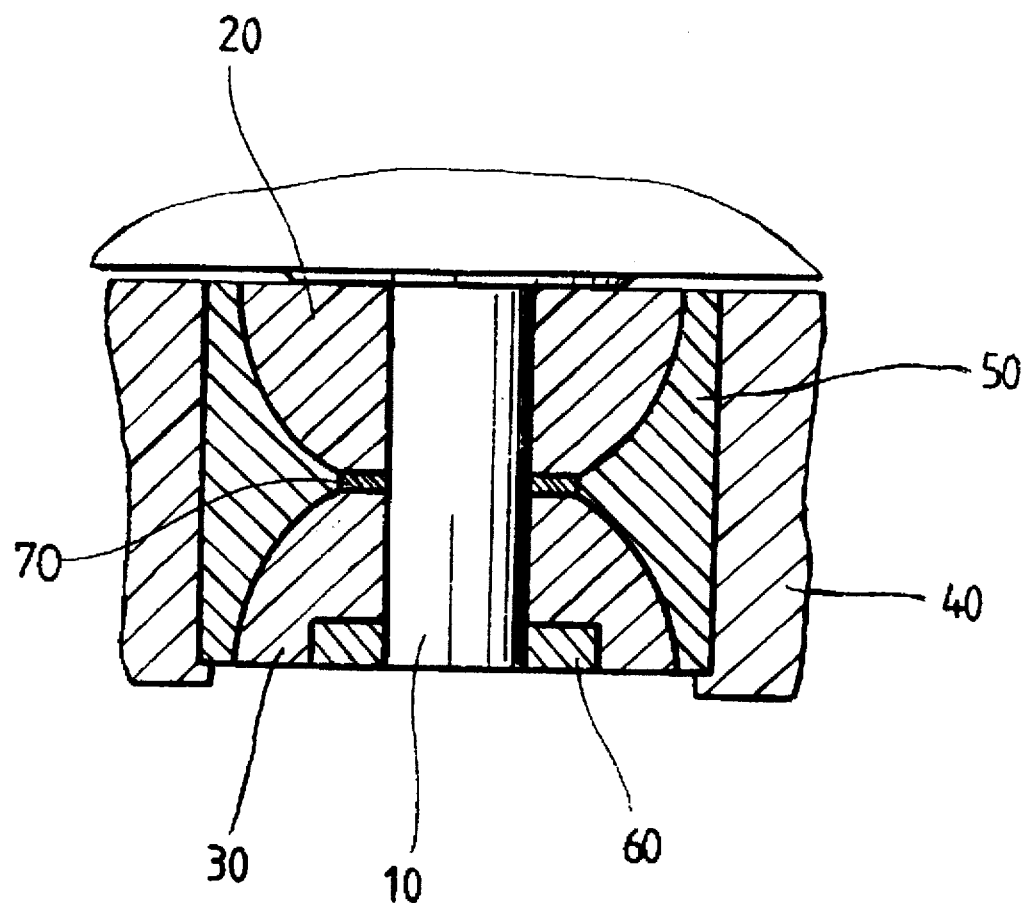
FIG. 1 is a sectional view of a conventional hemispherical fluid bearing.
Figure 2:
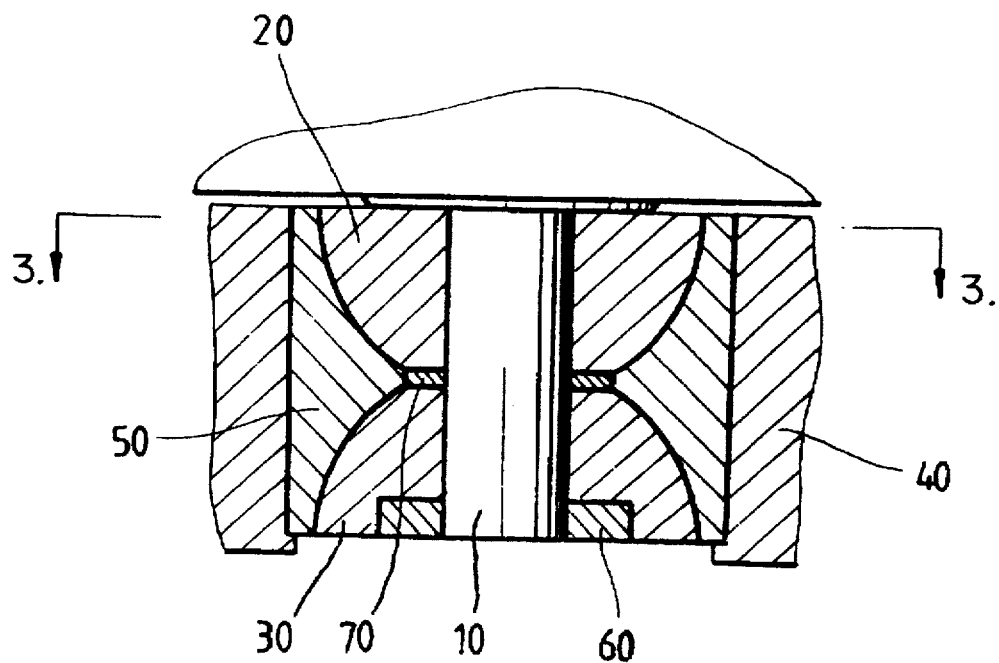
FIG. 2 is a sectional view of a hemispherical fluid bearing according to the present invention.
Figure 3:
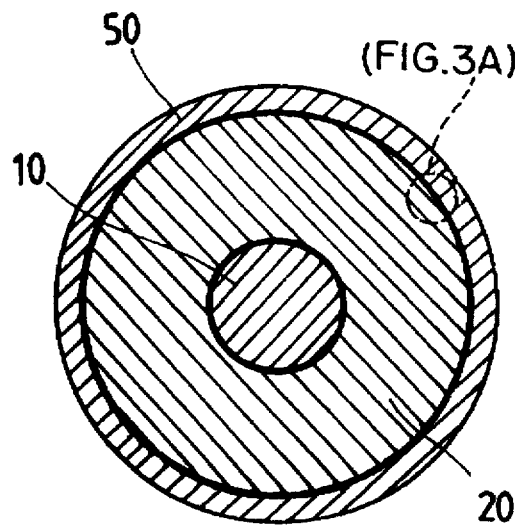
FIG. 3 is a sectional view taken along line A—A of FIG. 2.
Figure 3A:
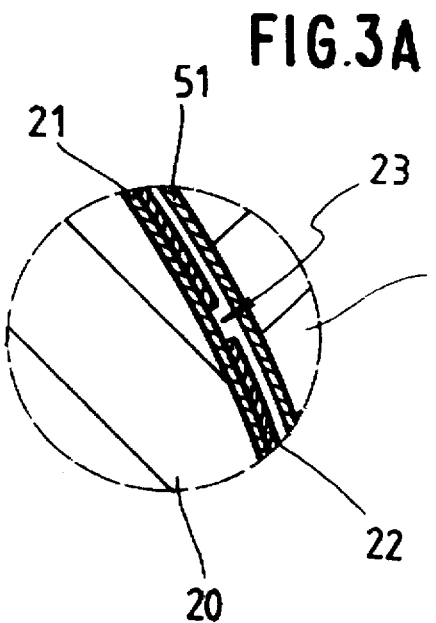

Referring to FIGS. 2 and 3, a hemispherical fluid bearing according to the present invention is comprised of an upper inner ring 20 and a lower inner ring 30, each having a hemispherical surface, which are fixed to a motor shaft 10 in opposition to each other, an outer ring 50 fixed in a bearing housing 40 for supporting upper inner ring 20 and lower inner ring 30 so that they can rotate, a ring 60 for keeping upper inner ring 20 and lower inner ring 30 from being detached from shaft 10, and a spacer 70 disposed between upper inner ring 20 and lower inner ring 30 for maintaining clearance between outer ring 50 and upper inner ring 20, and between outer ring 50 and lower inner ring 30. Ring 60 may be force fitted or be screwed to shaft 60.

Upper inner ring 20 and lower inner ring 30 formed mainly of high carbon steel or WCo are coated with a 5–20 µm thick titanium (Ti) film 21. Similarly, the lubricating surface of outer ring 50 is formed mainly of high carbon steel or WCo and is coated with a 5–20 µm thick Ti film 51. Ti film coatings 21 and 51 can be replaced with a ceramic film coating, for example, an $Al_2O_3$ film coating. In addition, upper inner ring 20, lower inner ring 30, and outer ring 50 may all be formed of ceramic.

The film coating serves to alleviate the abrasion between outer ring 50 and upper inner ring 20, and between outer ring 50 and lower inner ring 30, which is caused by solid friction therebetween when a motor starts or stops, namely, at or below a threshold speed.

On the other hand, to further reduce the abrasion caused by the solid friction, a diamond-like-carbon (DLC) film coating 22 of 0.1–5 µm is coated on Ti film coating 21 of upper inner ring 20 and lower inner ring 30. Since DLC film coating 22 has a linear expansion coefficient similar to that of Ti film coating 21, there is no concern about flaking or a change of clearance. Further, the former is more resistant to friction than the latter, thus more efficiently alleviating the impact of the solid friction.

A groove 23 is formed in DLC film coating 22. Groove 23 may extend to Ti film coating 21 through DLC film coating 22 depending on the thickness of DLC film coating 22. Groove 23 lifts upper inner ring 20 and lower inner ring 30 away from outer ring 50 by generating oil pressure or air pressure when they rotate.

Further, DLC film coating 22 and groove 23 may be provided on outer ring 50.

An embodiment of a method for manufacturing the above hemispherical fluid bearing will be described, in detail. Upper inner ring 20 and lower inner ring 30, formed mainly of high carbon steel or WCo, are lapping-machined to have an out-of-sphericity (i.e. eccentricity) of 0.15–0.25 µm, and their spherical surfaces are coated with a 0.1–5 µm thick Ti film. Then, a 0.1–5 µm thick DLC film is coated on the Ti film.

A Ti ion beam projection method or a Ti gas deposition method can be used for the coating of the Ti film. The Ti film can be replaced with a ceramic film by the same method.

The lubricating surface of outer ring 50 is coated with a Ti film or a ceramic film to a thickness of 5–20 μm.

Thereafter, groove 23 is formed in DLC film coating 22 by a chemical corrosion method or an electrical discharge machining method.

As described above, the hemispherical fluid bearing according to the present invention can efficiently prevent abrasion caused by solid friction between an inner ring and an outer ring. Therefore, its longevity is approximately 500,000 start-stops, while the conventional bearing has a longevity of 100,000–200,000 start-stops.

What is claimed is:

1. A hemispherical fluid bearing comprising:
    a pair of inner rings, each having a spherical outer lubricating surface, said inner rings being fixed to a shaft in opposition to each other; and
    an outer ring having a lubricating surface corresponding to said lubrication surfaces of said inner rings for supporting the rotation of said inner rings;
    wherein each of said inner rings has a first film coating of titanium formed on the lubricating surface thereof, and a second film coating of a diamond-like-carbon which is formed on said first film coating.

2. A hemispherical fluid bearing as claimed in claim 1, wherein said outer ring is formed of ceramic.

3. A hemispherical fluid bearing as claimed in claim 1, wherein said outer ring is formed of titanium.

4. A hemispherical fluid bearing as claimed in claim 1, wherein a groove is formed in said second film coating.

5. A hemispherical fluid bearing as claimed in claim 4, wherein said groove extends to said first film coating.

6. A hemispherical fluid bearing as claimed in claim 1, wherein said first film coating is 5–20 μm thick.

7. A hemispherical fluid bearing as claimed in claim 1, wherein said second film coating is 0.1–5 μm thick.

* * * * *